VITREOUS MATERIAL FOR USE IN SEMICONDUCTOR DEVICES

Filed Dec. 6, 1963

INVENTORS
KOICHI IKEDA
HIROSHI YAMAMOTO
BY
Hopgood & Calimafde
ATTORNEYS

United States Patent Office 3,442,993

Patented May 6, 1969

3,442,993

VITREOUS MATERIAL FOR USE IN SEMICONDUCTOR DEVICES

Hiroshi Yamamoto and Koichi Ikeda, Tokyo, Japan, assignors to Nippon Electric Company Limited, Minatoku, Tokyo, Japan, a corporation of Japan Filed Dec. 6, 1963, Ser. No. 328,603
Claims priority, application Japan, Dec. 17, 1962, 37/57,289
Int. Cl. C01b *33/26;* C01g *21/02*
U.S. Cl. 264—61 8 Claims

ABSTRACT OF THE DISCLOSURE

A vitreous sealing glass composiiton is provided for sealing semiconductor elements having lead wires coupled thereto, the composition being formed of a low melting glass having a softening point ranging from about 225° to 325° C. and a coefficient of thermal expansion ranging from about 90 to $160 \times 10^{-7}$ per degree centigrade, the low melting glass having mixed herewith an inorganic oxide of lower coefficient of expansion than the glass in amounts sufficient to lower the coefficient of thermal expansion of the glass to a predetermined level. The mixture is applied to the semiconductor element being sealed and the whole heated to a temperature within the softening point range of the glass to cause said glass mixture to flow and seal off the element while avoiding setting up strains.

This invention relates to an improved vitreous material comprising glass and other insulators, and particularly to such a material having a low coefficient of thermal expansion and a low softening temperature which is useful in coating and sealing semiconductor elements to protect the same from various harmful influences in the atmosphere.

The general direction of recent progress in microminiaturizing semiconductor devices has been to seal a semiconductor element in a very small container by using glass, or to protect such element by coating with an insulating material. In such cases it is necessary to bring out the lead wires of the device through the insulating glass sealing the element, or through the coating protecting the element. With such arrangements however, there is danger that an air leak will develop adjacent the wires unless the coefficient of thermal expansion of the lead wires and that of the insulating material are equal or nearly equal. Such an air leak will ultimately result in deterioration of the proper functioning of the semiconductor device. Additionally, where the element is coated with an insulating material there is also the danger of causing strains and cracks in the semiconductor element, unless the coefficients of thermal expansion of the element and the coating material are equal or nearly equal, causing the device to become either inopeartive or to exhibit poor performance due to alteration of the characteristics of the element. If the heating temperature during the sealing or coating operation is high, it will naturally heat the semiconductor element and can easily harm the element because of its extremely small size. Consequently it is necessary to use a low melting point glass and to adjust its composition to produce a coefficient of thermal expansion of the desired value. It is extremely difficult, however, to make a glass having given predetermined properties suitable for manufacturing semiconductor devices as referred to above, due to the fact that lowering the softening temperature of a low melting point glass results generally in raising its coefficient of thermal expansion.

Accordingly, it is an object of this invention to provide an improved material suitable for use in sealing or coating extremely small semiconductor devices which avoids the disadvantages of the prior art materials described above.

Figure 1:
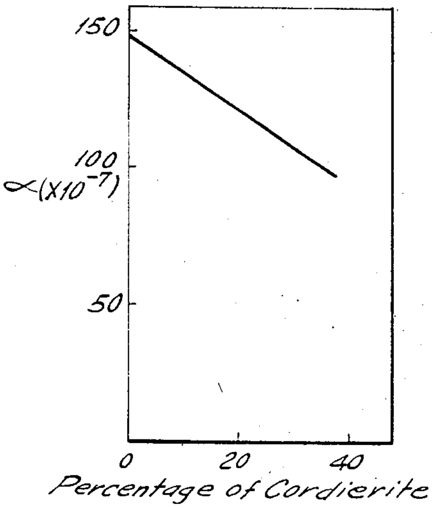
Figure 2:
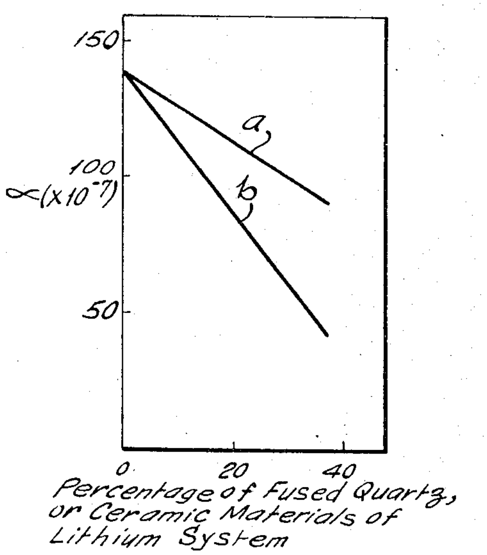
Figure 3:
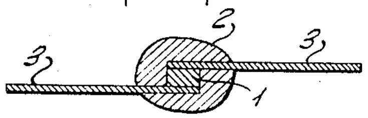
Figure 4:
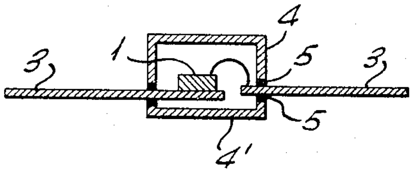

All of the objects, features and advantages of this invention and the manner of attaining them will become more apparent and the invention itself will be best understood by reference to the following description of an embodiment of the invention taken in conjunction with the accompanying drawing, in which FIGS. 1 and 2 are graphs showing the relation between the material composition and the coefficients of thermal expansion thereof of vitreous material made in accordance with this invention, and FIGS. 3 and 4 show cross sectional views of two embodiments in which semiconductor devices utilize the material made in accordance with the invention.

Briefly, in accordance with the invention there is provided a material which is a sintered mixture of a low melting point glass and one or more of the following materials: (a) inorganic oxide insulating materials having low coefficients of thermal expansion such as for example, fused quartz, cordierte, zirconia, aluminum silicate ceramics, alumina, beryllia, mica, Vycor glass (Corning Glass Works), borosilicate glass, etc., and (b) ceramic insulating material of $Li_2O$-$Al_2O_3$-$SiO_2$ composition having a negative coefficient of thermal expansion.

A first embodiment of the invention will now be described in which the low melting point glass may comprise the composition $PbO$-$B_2O_3$-$Tl_2O$, disclosed in U.S. Application Ser. No. 329,854 filed Dec. 11, 1963. The softening temperature of this glass in the range of 225° C.–325° C. and the coefficient of thermal expansion (referred to hereinafter as $\alpha$), is of the order of $90–160 \times 10^{-7}/°$ C. When powdered glass whose composition is 61% PbO, 9% $B_2O_3$ and 30% $Tl_2O$ ($\alpha = 148 \times 10^{-7}/°$ C. is uniformly mixed with powdered inorganic oxide, such as for example, cordierite, having an extremely small coefficient of thermal expansion $\alpha$, of the order of $24 \times 10^{-7}/°$ C., and heated to approximately 310° C. for ten minutes, to sinter the inorganic oxide with the glass, a sintered mixture is produced containing up to 40% by volume of said oxide having a coefficient of thermal expansion characteristic, see FIG. 1. This characteristic is determined by the volume ratio of the constituent materials because at this temperature no melting reaction takes place between the oxide and the glass. Accordingly, a sintered mixture with the desired low coeffiicent of thermal expansion may be easily obtained by properly selecting the ratio of the oxide and the glass. The softening tempearture of this mixture is the same as that of the glass constituent which forms a part of the mixture.

In a second embodiment of the invention, the glass may be in powdered form having the composition of 58% PbO, 8% $B_2O_3$, 29% $Tl_2O$, 3% $SiO_2$, 1% $Al_2O_3$, and 1% $Li_2O$, which has a coefficient of thermal expansion of $140 \times 10^{-7}/°$ C. When this glass is uniformly mixed with fused quartz powder having an extremely small coefficient of thermal expansion in amounts up to about 40% by volume, and heated and sintered at approximately 320° C. for ten minutes, the coefficient of thermal expansion decreases in proportion to the ratio of the fused quartz to the glass as shown by the line *a* in FIG. 2.

As a third embodiment, when the same powdered glass employed in the second embodiment is uniformly mixed with a lithia system ceramic material having a composition of 11.9% $Li_2O$, 40.4% $Al_2O_3$, and 47.7% $SiO_2$, having a negative coefficient of thermal expansion $\alpha$ of $-108 \times 10^{-7}/°$ C., and is heated and sintered at approximately 320° C. for ten minutes, the coefficient of thermal expansion of the mixture decreases in proportion to the ratio of the ceramic up to about 40% by volume to the glass as shown by the line *b* in FIG. 2. The softening temperature of the sintered mixtures of embodiments 2 and 3 were also shown to be the same as that of the glass constituent employed.

The availability of the vitreous materials of this invention makes it possible to decrease the percentage of defective semiconductor devices manufactured and also results in a statistically higher reliability. This, of course, results from being able, in accordance with the invention, to produce a vitreous material having an accurately predetermined coefficient of thermal expansion by using predetermined ratios of constituent materials up to about 40% by volume of the mixtures. Thus, for example, a vitreous sintered mixture may be made to have a coefficient of thermal expansion of $60\times10^{-7}/°$ C., to provide a coating on a silicon element 1 (see FIG. 3) at approximately 310° C., which employs lead wires of an iron-nickel alloy also having a coefficient of thermal expansion of $60\times10^{-7}/°$ C. As a result, the lead wires 3 can be sealed securely without causing strain in the semiconductor element 1 or any serious problem of difference in the thermal expansion of the sintered mixture and the wire. The relatively low coating temperature of 310° C. is a further advantage as it tends to ameliorate slight strain which could result due to slight mismatch in the coefficients of thermal expansion of the element 1, and the coating 2 in practical situations.

In FIG. 4 small dish shaped ceramic plates 4 and 4' are shown glazed in ring shape with a sintered mixture as described above, to enclose a semiconductor element 1. The glazed parts are thereafter heated to a very low temperature to seal the element 1 without substantially increasing its temperature and hence preventing changes in its characteristics. It is of course desirable to select a material for the lead wire 3 having a suitable coefficient of thermal expansion.

It will be appreciated that in accordance with this invention, a sintered mixture is produced which has good insulating qualities and low coefficients of thermal expansion, these characteristics making it exceedingly suitable as a sealing or coating material for miniature semiconductor device manufacture.

While the foregoing description sets forth the principles of the invention in connection with specific apparatus, it is to be understood that the description is made only by way of example and not as a limitation of the scope of the invention as set forth in the objects thereof and in the accompanying claims.

What is claimed is:

1. An improved vitreous material having a desired coefficient of thermal expansion for use in sealing microminiaturized semiconductor devices at low sealing temperatures which comprises, a powder mixture of a low melting point glass consisting essentially of $$PbO\text{-}B_2O_3\text{-}Tl_2O$$

having a softening temperature ranging from about 225° C. to 325° C. and a coefficient of thermal expansion of the order of about 90 to $160\times10^{-7}$ per degree centigrade, and up to about 40% by volume of an inorganic oxide powder of lower coefficient of thermal expansion selected from the group consisting of fused quartz, cordierite, zirconia, aluminum silicate, alumina, beryllia, mica, Vycor glass, and $Li_2O\text{-}Al_2O_3\text{-}SiO_2$, said glass and oxide powder being sintered together at the softening temperature of said glass to produce the desired thermal coefficient.

2. The improved vitreous material of claim 1, wherein said low melting glass contains approximately 61% of PbO, 9% of $B_2O_3$ and 30% of $Tl_2O$, and wherein said inorganic oxide powder is cordierite.

3. The improved vitreous material of claim 1, wherein said low melting glass contains approximately 58% PbO, 8% $B_2O_3$, 29% $Tl_2O$, 3% $SiO_2$, 1% $Al_2O_3$ and 1% $Li_2O$, and wherein said inorganic oxide powder is fused quartz.

4. The improved material of calim 1, wherein said low melting glass contains approximately 58% PbO, 8% $B_2O_3$, 29% $Tl_2O$, 3% $SiO_2$, 1% $Al_2O_3$ and 1% $Li_2O$ and wherein said inorganic oxide contains approximately 11.9% $Li_2O$, 40.4% $Al_2O_3$ and 47.7% $SiO_2$.

5. In a method of producing a miniaturized semiconductor component comprising a semiconductor element coupled to a pair of lead wires, the improvement which comprises, sealing said semiconductor element by forming a powder mixture of a low melting point glass consisting esentially of $PbO{=}B_2O_3{=}Tl_2O$ having a low softening point of about 225° C. to 325° C. and a coefficient of thermal expansion of about 90 to $160\times10^{-7}$ per degree centigrade with up to about 40% by volume of an inorganic oxide of lower coefficient of thermal expansion selected from the group consisting of fused quartz, cordierite, zirconia, aluminum silicate, alumina, beryllia, mica, Vycor glass, and $Li_2O{=}Al_2O_3{=}SiO_2$, applying said glass mixture to said semiconductor element having lead wires with thermal expansion corresponding to that of said glass mixture, and sintering said mixture at a sealing temperature corresponding to the low softening point of said glass to minimize strains in the semiconductor element.

6. The method of claim 5, wherein the low melting glass contains approximately 61% PbO, 9% $B_2O_3$ and 30% $Tl_2O$, and wherein said inorganic oxide is cordierite.

7. The method of claim 5, wherein the low melting glass contains approximately 58% PbO, 8% $B_2O_3$, 29% $Tl_2O_3$, 3% $SiO_2$, 1% $Al_2O_3$ and 1% $Li_2O$, and wherein said inorganic oxide is fused quartz.

8. The method of claim 5, wherein said low melting glass contains approximately 58% PbO, 8% $B_2O_3$, 29% $Tl_2O$, 3% $SiO_2$, 1% $Al_2O_3$ and 1% $Li_2O$, and wherein said inorganic oxide contains approximately 11.9% $Li_2O$, 40.4% $Al_2O_3$ and 47.7% $SiO_2$.

References Cited

UNITED STATES PATENTS

| | | | |
|---|---|---|---|
| 2,853,393 | 9/1958 | Beck et al. | 106—47 |
| 3,078,186 | 2/1963 | Tierney | 117—23 |
| 3,109,053 | 10/1963 | Ahearn | 117—217 |
| 3,144,318 | 8/1964 | Bruen et al. | 29—588 |
| 3,211,826 | 10/1965 | Holcomb et al. | 106—49 |
| 3,238,151 | 3/1966 | Kim | 106—49 |
| 3,300,339 | 1/1967 | Perri et al. | 117—201 |

HELEN M. McCARTHY, *Primary Examiner.*

U.S. Cl. X.R.

29—588; 106—39, 47